United States Patent
Hagen

(10) Patent No.: US 9,360,353 B2
(45) Date of Patent: Jun. 7, 2016

(54) MEASUREMENT DEVICE AND METHOD FOR DETERMINING A FLUID FILL LEVEL IN A FUEL TANK

(75) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 832 days.

(21) Appl. No.: 13/230,004

(22) Filed: Sep. 12, 2011

(65) Prior Publication Data

US 2012/0234074 A1 Sep. 20, 2012

(30) Foreign Application Priority Data

Sep. 13, 2010 (DE) .......................... 10 2010 045 212

(51) Int. Cl.
| | |
|---|---|
| *G01F 23/30* | (2006.01) |
| *G01F 1/32* | (2006.01) |
| *G01F 1/36* | (2006.01) |
| *G01F 22/02* | (2006.01) |
| *G01F 23/00* | (2006.01) |
| *G01F 25/00* | (2006.01) |

(52) U.S. Cl.
CPC .. *G01F 1/32* (2013.01); *G01F 1/36* (2013.01); *G01F 1/363* (2013.01); *G01F 22/02* (2013.01); *G01F 23/0076* (2013.01); *G01F 25/0061* (2013.01)

(58) Field of Classification Search
CPC .............................. G01F 23/30; G01F 23/0038
See application file for complete search history.

(56) References Cited

U.S. PATENT DOCUMENTS

| | | | |
|---|---|---|---|
| 4,091,669 A * | 5/1978 | Fehr et al. ........................ 73/299 |
| 4,852,054 A * | 7/1989 | Mastandrea ........ G01F 23/0076 340/605 |
| 5,666,851 A | 9/1997 | Bacon |
| 6,057,773 A | 5/2000 | Shukla et al. |
| 6,584,838 B2 * | 7/2003 | Lorenzen ......................... 73/314 |
| 7,004,191 B2 | 2/2006 | Shajii et al. |
| 2004/0079150 A1 | 4/2004 | Breed et al. |
| 2006/0157146 A1 | 7/2006 | Hillam et al. |
| 2007/0113623 A1 * | 5/2007 | Wolford et al. ................ 73/49.2 |

FOREIGN PATENT DOCUMENTS

| | | |
|---|---|---|
| DE | 39 26 552 A1 | 2/1991 |
| DE | 44 26 686 A1 | 2/1995 |
| DE | 101 09 058 A1 | 9/2002 |
| DE | 102009030077 | 12/2009 |
| EP | 1 437 579 A2 | 7/2004 |
| EP | 2 180 299 A1 | 4/2010 |
| GB | 2 293 013 A | 3/1996 |

(Continued)

OTHER PUBLICATIONS

Chinese Search Report dated Oct. 10, 2014.

*Primary Examiner* — Laura Martin
*Assistant Examiner* — Alex Devito
(74) *Attorney, Agent, or Firm* — Henry M. Feiereisen LLC

(57) ABSTRACT

The invention relates to a measurement device (12) for determining a fluid fill level (14) in a fuel tank (10) for a vehicle. The position of a float (18) in relation to a signal generating unit (22) which can be attached on the fuel tank (10) can hereby be converted into a signal that is correlated with the fill level (14) of the undeformed fuel tank (10). A correction device (48, 54, 56) is designed for measuring a deformation of the fuel tank (10) and is used for correcting the signal. The invention also relates to a method for determining a fluid fill level (14) in a fuel tank (10) for a vehicle.

5 Claims, 3 Drawing Sheets

(56) References Cited

FOREIGN PATENT DOCUMENTS

| JP | 5 264 319 A | 10/1993 |
| JP | 2004212249 A | 7/2004 |
| JP | 2005325729 A | 11/2005 |
| WO | WO 2010/058411 | 5/2010 |

* cited by examiner

MEASUREMENT DEVICE AND METHOD FOR DETERMINING A FLUID FILL LEVEL IN A FUEL TANK

CROSS-REFERENCES TO RELATED APPLICATIONS

This application claims the priority of German Patent Application, Serial No. 10 2010 045 212.2, filed Sep. 13, 2010, pursuant to 35 U.S.C. 119(a)-(d), the content of which is incorporated herein by reference in its entirety as if fully set forth herein.

BACKGROUND OF THE INVENTION

The present invention relates to a measurement device for determining a fluid fill level in a fuel tank for a vehicle. The measurement device includes a float and a signal generating unit which can be fastened on the fuel tank. A position of the float relative to the signal generating unit can be converted to a signal which correlates with the fill level of the undeformed fuel tank. The invention also relates to a method for determining a fluid fill level in a fuel tank.

The following discussion of related art is provided to assist the reader in understanding the advantages of the invention, and is not to be construed as an admission that this related art is prior art to this invention.

Conventional measurement devices can measure and compensate for tilting of the fuel tank when driving, for example, downhill. However, particularly unfavorable relative positions of the float in relation to the signal generating unit due to the deformation of the fuel tank or due to tilting of components of the measurement device may cause incorrect fill level indications in the conventional measurement devices.

In addition, even with measurement devices where the float is not coupled with the signal generating unit attached on the fuel tank, deformations of the fuel tank can occur which then cause an incorrect display of the fluid fill level in the fuel tank.

It would therefore be desirable and advantageous to obviate prior art shortcomings and to provide an improved a measurement device and a corresponding method which improve the determination of the fluid fill level in the fuel tank.

SUMMARY OF THE INVENTION

According to one aspect of the present invention, a measurement device for determining a fluid fill level in a fuel tank of a vehicle includes a float, a signal generating unit fastened on the fuel tank, wherein a position of the float a relative to the signal generating unit is converted to a signal which correlates with the fluid fill level of an undeformed fuel tank, and a correction device configured to determine a deformation of the fuel tank, wherein the signal is corrected with the correction device to account for the deformation of the fuel tank.

The invention is based on the observation that the signal generated by the signal generation unit, which correlates with the fill level of the undeformed fuel tank, may cause an indication of a fill level which is significantly different from the actual fill level, due to a deformation of the fuel tank. This is particularly the case when the fuel tank is constructed as a pressurized tank, i.e., a closed tank, which does not communicate with the environment via an always open line (which is typically provided with an active charcoal filter).

However, even when a fuel tank is connected with the environment by way of such line provided with the active charcoal filter, a slight vacuum or overpressure with respect to ambient pressure may be generated inside the fuel tank due to temperature changes.

The deformation of the fuel tank occurring in conjunction with the vacuum or the overpressure is of particular importance in a closed fuel tank, where the measurement of the deformation of the fuel tank and the correction of the signal with the correction device can be particularly advantageously employed.

The measurement device according to the invention enables an improved determination of the fluid fill level in the fuel tank, because the deformation of the fuel tank is taken into account, for example when using signal generating units where the float is mechanically coupled with the signal generating unit. The measurement device, however, may also be used with systems where the float is cooperating with a signal generating unit, which is stationarily held on the fuel tank, without being in direct contact. In particular, such signal generating unit may be a measuring board having a Reed switch or an electrode measuring changes in the capacity due to the movement of the float.

Complex measures for a deformation-compensating support of components of the signal generating unit, as commonly used in the art, can be obviated by correlating the signal of the signal generating unit.

Correcting the signal based on the measured deformation of the fuel tank safely prevents indication of an incorrect fluid level. A vehicle having a fuel tank disposed in the vehicle can advantageously be prevented from becoming stranded because the fuel actually present lasts only for a shorter route than is apparent from the fill level indication.

According to an advantageous feature of the present invention, the correction device may be designed for measuring an extent of the deformation or a quantity determining the extent of the deformation. This allows a particularly accurate compensation of a misrepresentation of the signal generated by the signal generating unit due to the deformation of the fuel tank.

The measurement device may include a control device for controlling a display, wherein at least one characteristic curve is stored in the control device, which provides at least one correction value which depends on the extent of the deformation of the fuel tank for correcting the signal of the signal generating unit. The characteristic curve can be used by the control device to correct the signal of the signal generating unit which does not indicate the actual fluid fill level due to the deformation of the fuel tank. When using this type of measurement device, no changes need to be made to the signal generating unit, so that an existing measurement device can be easily retrofitted.

According to an advantageous feature of the present invention, the correction device may include at least one pressure sensor for measuring a vapor pressure in the fuel tank. The extent of the pressure-dependent deformation of the fuel tank can be deduced from the vapor pressure in the fuel tank. In particular, the pressure sensor may be employed with a fuel tank where a deviation from standard pressure causes a significant deformation of the fuel tank, for example with a fuel tank made of plastic. However, the pressure-dependent deformation of the fuel tank can also be deduced by measuring the vapor pressure in the fuel tank if the fuel tank made of a metal, in particular steel. The pressure-dependent deformation can be specifically determined for the type of the respective fuel tank, i.e., depending on the material, the nominal volume and the shape.

According to an advantageous feature of the present invention, the at least one pressure sensor may be arranged in the fuel tank and coupled with the control device. The signal generated by the signal generating unit, which does not indicate the actual fluid fill level due to the deformation of the fuel tank and the signal provided by the pressure sensor are processed in the control device. In particular, if a pressure sensor is provided anyway to monitor the pressure in the fuel tank, the signal supplied by the pressure sensor can be easily used for correcting the signal provided by the signal generating unit. To this end, only the specific characteristic curve for the type of the fuel tank needs to be stored in the control device and the control device needs to be designed for processing both signals.

Alternatively or in addition, the at least one pressure sensor may be integrated in the signal generating unit or in the float—or also in a coupling element which couples the signal generating unit with the float. A corrected signal can then be transmitted from the signal generating unit to the control unit via a signal path of the signal generating unit. In this case, a characteristic curve for correcting the signal need not be stored in the control device, because the signal corrected by the pressure sensor is transmitted directly to the control device. Such pressure sensor may include a membrane arranged, for example, on the float or on the signal generating unit, wherein the pressure-dependent excursion of the membrane supplies a measurement value which corrects the signal generated by the signal generating unit. The control device then does not need to evaluate two signals, and the supplied signal can instead be directly converted to control the display for indicating the fluid level. In this embodiment of the invention, no changes need to be made to a control device which is only designed for processing the signal of the signal generating unit to correctly control the display.

According to an advantageous feature of the present invention, the correction device may include at least one temperature sensor for measuring a temperature of the fuel tank. In this way, material expansions or contractions due to a temperature can be taken into account. This is advantageous in particular if the fuel tank is made of a plastic material which has a greater thermal expansion coefficient than a steel tank.

When using the temperature sensor in addition to a pressure sensor of the correction device, a characteristic curve stored in the control device may take into account both quantities, namely the pressure and temperature, when providing a correction value for correcting the signal of the signal generating unit.

According to another advantageous feature of the present invention, the correction device may include at least one distance transducer for measuring a change in length. It is hereby unimportant if the deformation is caused by pressure and/or temperature. A characteristic curve stored in the control device can then also take into account the change in length when providing a correction value for correcting the signal of the signal generating unit. At least one distance transducer can be provided in addition to a pressure sensor and/or a temperature sensor of the correction device.

According to yet another advantageous feature of the present invention, an actual position of the signal generating unit and the fuel tank which is different from a nominal position may be taken into account by coupling at least one distance transducer with, on one hand, the signal generating unit and, on the other hand, a wall of the fuel tank. It is hereby unimportant if the measured actual position depends on pressure stress and/or temperature stress applied to the fuel tank. A deformation or tilting of components of the measurement device caused by a mechanical load can also be measured and processed.

According to still another advantageous feature of the present invention, the correction device may be designed for correcting the signal for a deformation of the fuel tank caused by an overpressure and/or a vacuum. Different deformations of the fuel tank caused by a vacuum and an overpressure can then be taken into account. The pressure in the fuel tank under vacuum can reach 100 mbar below ambient pressure, whereas the pressure in the fuel tank under overpressure can reach 300 mbar above ambient pressure.

According to another aspect of the present invention, a method for determining a fluid fill level in a fuel tank of a vehicle includes the steps of supplying with a signal generating unit a signal indicating the fluid fill level, measuring a deformation of the fuel tank, and correcting the signal based on the measured deformation.

In this way, it can be ensured that the actually indicated fluid fill level is not falsified by a deformation of the fuel tank. The deformation of the fuel tank can be measured and corrected, in particular, by a correction device.

The advantages and preferred embodiments described for the measurement device according to the invention apply likewise also to the method according to the invention for determining the fluid fill level.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
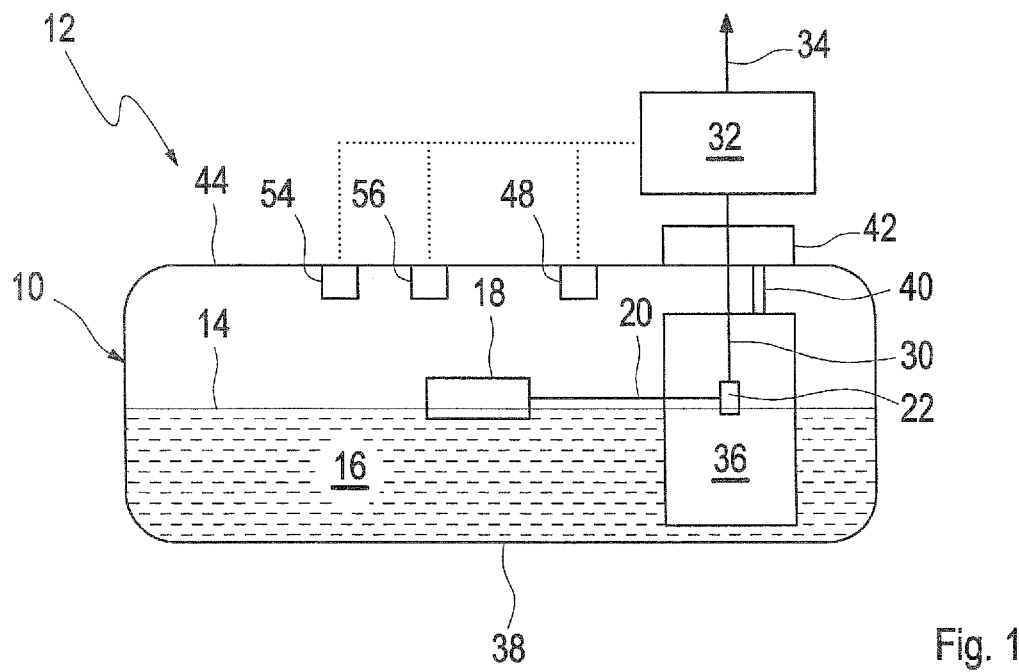
FIG. 1 shows, in a schematic diagram, an undeformed fuel tank for a vehicle, with a fill level sensor, wherein a float of the fill level sensor is coupled to a signal transducer via an arm.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in a schematic diagram a fuel tank 10 and a measurement device 12 for determining a fill level 14 of the fuel 16 in the fuel tank 10. The fuel tank 10 is constructed as a pressurized tank of a vehicle, i.e. a closed tank, which is not in communication with the environment of the fuel tank 10 via an always open vent line. In particular, such pressurized tank can be used in a hybrid vehicle. In a hybrid vehicle, gaseous fuel should be prevented from being released into the environment even if the internal combustion engine of the automobile is not operated for an extended period of time, i.e. when fuel vapors cannot be dissipated by combustion in the internal combustion engine. A pressurized tank can be particularly inexpensively produced from plastic.

The measurement device 12 includes a float 18 floating on the fuel 16, which is coupled to a signal transducer 22 via an arm 20. The changing angular position of the arm 20 relative to the signal transducer 22, which changes with the changing the fill level 14 in the fuel tank 10, is converted into an electrical signal, for example a resistance value. The resistance value indicates for an undeformed fuel tank 10 how much fuel 16 is left in the fuel tank 10.

Figure 5:
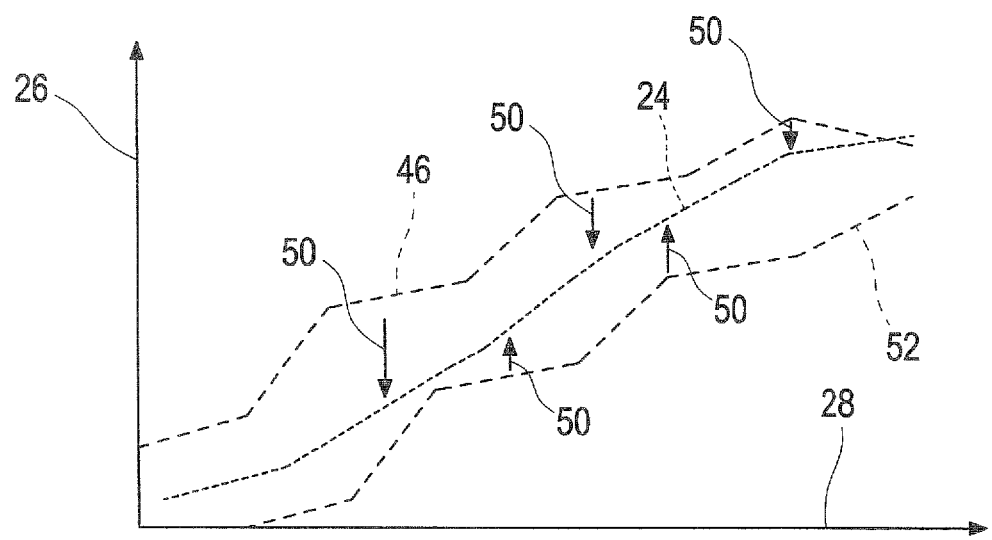
FIG. 5 shows a height-volume curve, which shows the dependence of the fill level indicated by the signal transducer from the fuel volume present in the fuel tank, wherein the actual curves are corrected to match a nominal curve.

A corresponding characteristic curve for the undeformed fuel tank 10 is shown in FIG. 5 as a nominal curve 24 in a coordinate system where the fill level is indicated on the ordinate 26 and the actual fill volume of the fuel 16 in the fuel tank 10 is indicated on the abscissa 28. The fill level is used to display an (absolute or relative) display volume or a range on a tank display of the vehicle.

The signal transducer 22 transmits hereby the electrical signal via a signal path 30 to a control device 32 which in turn controls the (unillustrated) tank display in a combined instrument of the automobile, as illustrated in FIG. 1 by an arrow 34.

In the present example, the signal transducer 22 is arranged on a feed unit 36 which is supported on the bottom 38 of the fuel tank 10 by an (unillustrated) support under spring bias. A line 40 extends from the feed unit 36 via a tank flange 42 to outside the fuel tank 10 and from there to an (unillustrated) internal combustion engine of the vehicle.

Figure 2:
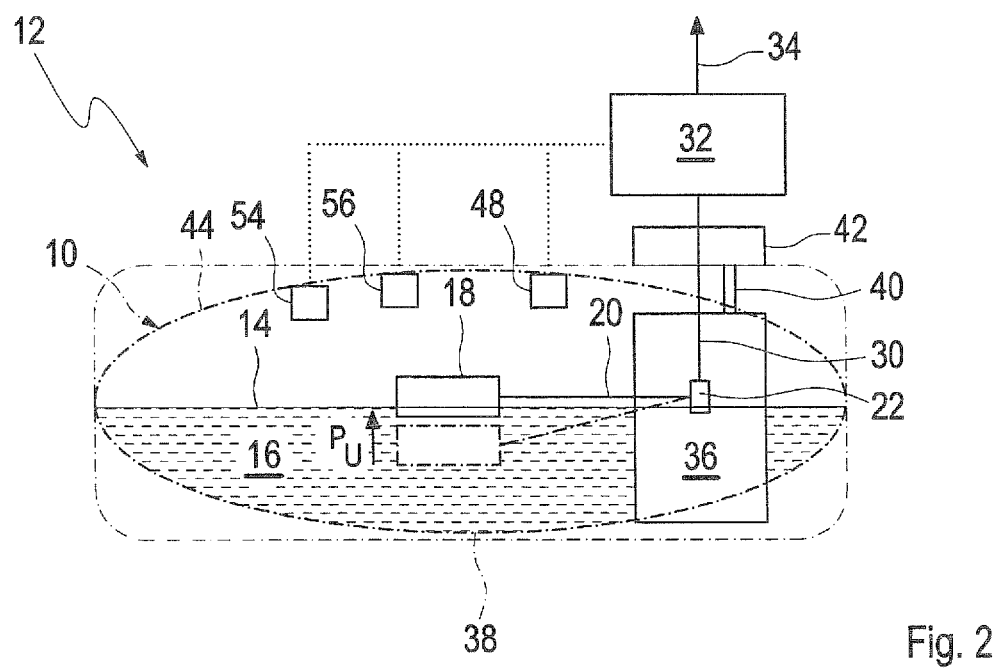
FIG. 2 shows, in a schematic diagram, a deformation of the fuel tank caused by a vacuum, wherein an angular position of the arm relative to the signal transducer is changed by the deformation.

FIG. 2 shows a situation where the fuel tank 10 is under vacuum, causing deformation of the fuel tank 10. The deformation of the walls 44 of the fuel tank 10 causes an angular position of the arm 20 in relation to the signal transducer 22 to be different from that in an undeformed fuel tank 10. According to a first embodiment, when the fuel tank 10 is deformed by the vacuum, the signal transducer 22 transmits to the control device 32 a signal which corresponds to a greater fill height than in an undeformed fuel tank 10. Such correlation of the displayed fill height and the actual fill volume is shown in FIG. 5 by an actual curve 46.

In the present example, a pressure sensor 48 measures the vapor pressure in the fuel tank 10 and transmits the vapor pressure to the control device 32. The control device 32 processes the signal supplied by the signal transducer 22 and the signal supplied by the pressure sensor 48, wherein a characteristic curve is stored in the control device 32 which provides correction values that depend on the extend of the deformation of the fuel tank 10. FIG. 5 shows individual exemplary correction values in form of arrows 50. Values on the actual curve 46 are corrected with the corresponding correction values, so that the course of the actual curve 46 approaches the nominal curve 24.

In the deformation of the fuel tank (see FIG. 2) caused by the vacuum, the signal generated by the signal transducer 22 may indicate a lower fill level than the actual fill level, depending on the shape of the fuel tank and the mounting location of the signal transducer 22. The correction values according to the arrows 50 also enable the actual curve 52 to approach the nominal curve 24.

Figure 3:
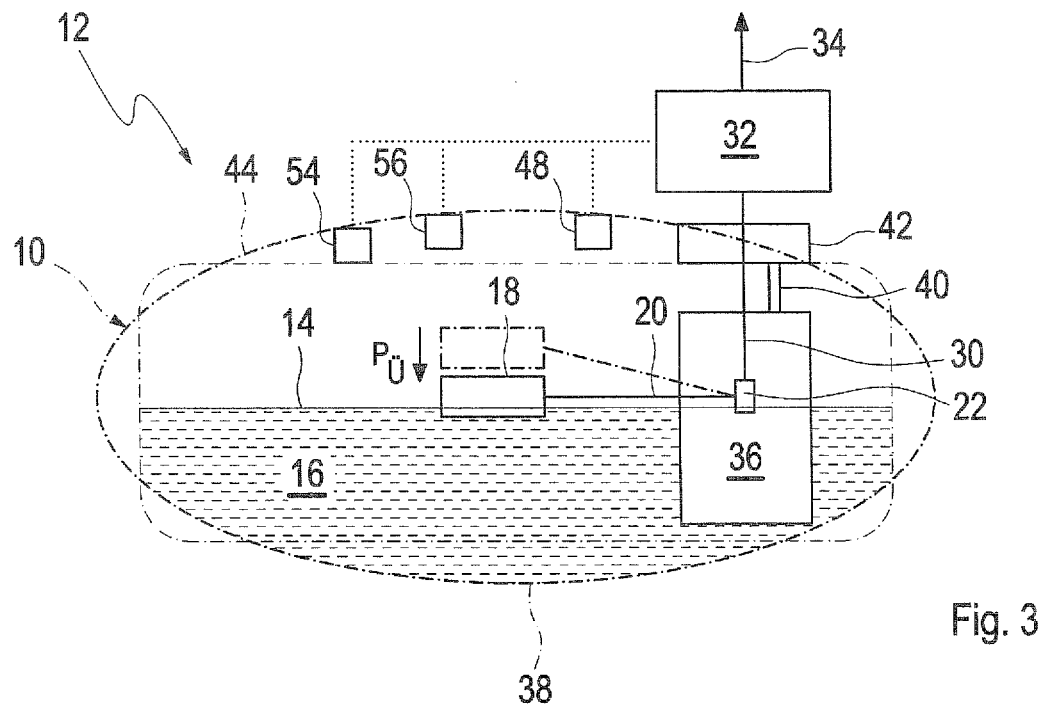
FIG. 3 shows, in a schematic diagram, a change of the angular position of the arm caused by a deformation due to an overpressure in the tank.

FIG. 3 indicates a situation where deformation of the fuel tank 10 is caused by overpressure in the fuel tank 10. The is again causes in angular position of the arm 20 in relation to the signal transducer 22 which is converted by the signal transducer into a lower fill level than the actual fill level in the fuel tank 10. The actual curve 52 shown in FIG. 5 is an example for such correlation between the indicated fill level and the associated fill volume.

The correction value supplied by the pressure sensor 48 also ensures for a deformation due to overpressure that the control device 32 directly controls the tank display. With the signals supplied from the pressure sensor 48 to the control device 32, the values on the actual curve 52 can be corrected by the corresponding correction values based on a corresponding characteristic curve stored in the control device 32 and matched to the nominal curve 24.

Figure 4:
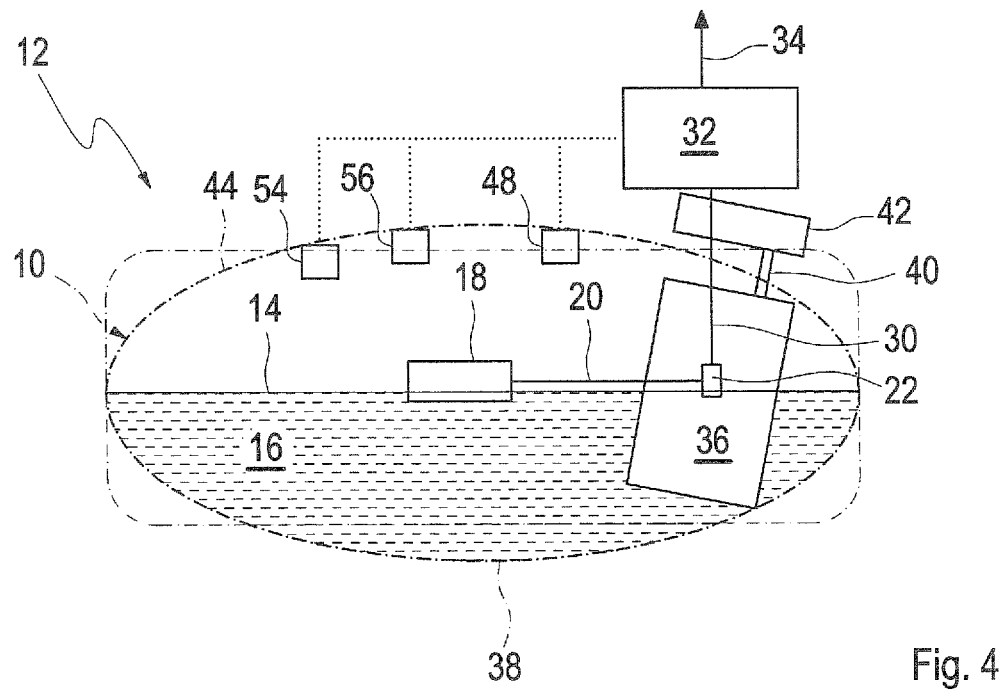
FIG. 4 shows a change in the angular position of the arm, wherein the arm is deformed due to a change of the pressure in the fuel tank, causing the position of the signal transducer to deviate from its nominal position.

FIG. 4 lastly illustrates a situation where a pressure-induced deformation of the fuel tank 10 causes the feed unit 36 and thus also the signal transducer 22 attached to the feed unit 36 to tilt relative to the arm 20. The pressure sensor 48 then also enables a correction of the signal supplied from the signal transducer 22 to the control device and hence a correct indication of the fill level.

In an alternate embodiment, a pressure sensor may be arranged on the float 18 or on the signal transducer 22. Advantageously, such pressure sensor is then coupled via the signal path 30 with the control device 32. The electrical signal supplied by the signal transducer 22 to the control device 32 can then already be corrected before the signal reaches the control device 32. Both the pressure sensor 48 arranged in the fuel tank and the pressure sensor coupled with the control device 32 via the signal path 30 may be provided.

Preferably, a temperature sensor 54 is also provided which is also coupled with the control device 32. Correction values are then determined from the pressure signal transmitted from the pressure sensor 48 and from the temperature signal determined by the temperature sensor 54, which can be used to correct the respective actual curve 46, 52. In alternative embodiments, the temperature sensor 54 may be arranged in the float 18 or on the signal transducer 22 or on the arm 20 to transmit a corrected signal to the control device 32 via the signal path 30.

Alternatively or in addition, distance transducers 56 may be provided which measure a change in length of the walls 44 of the fuel tank 10 and transmit corresponding measurement values to the control device 32. The control device 32 then converts these measurement values into corresponding correction values, whereby the values of the actual curves 46, 52 can be matched to the nominal curve 24. Corresponding characteristic curves, which allow correction of the actual curves 46, 52 according to the arrows 50, supply deformation-dependent correction values determined for the respective type of the fuel tank 10. The characteristic curves are stored in the control device 32.

According to another embodiment, when the tank display is controlled by the control device 32, a tilt of the feed unit 36 (see FIG. 4) can be taken into account by coupling the distance transducers 56, on one hand, with the wall 44 of the fuel tank and, on the other hand, with the signal transducer 22 or the feed unit 36, even if the tilt is not caused by a pressure or temperature variation in the fuel tank 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A measurement device for correcting a fluid fill level in a fuel tank of a vehicle caused by a deformation of the fuel tank, comprising:
   a float,
   a signal generating unit fastened on the fuel tank, wherein a position of the float relative to the signal generating unit is converted to a signal which correlates with the fluid fill level of the fuel tank,
   at least one pressure sensor arranged above the fluid fill level in a vapor space of the fuel tank for determining a vapor pressure in the fuel tank,
   a control device storing at least one characteristic curve providing at least one correction value describing an extent of a deformation of the fuel tank, in comparison to an undeformed fuel tank, as a function of the vapor pressure in the fuel tank determined by the at least one pressure sensor,
   a correction device configured to determine based on the signal and the deformation of the fuel tank computed with the at least one correction value a corrected fluid fill level of the undeformed fuel tank that takes into account the deformation of the fuel tank.

2. The measurement device of claim 1, wherein the at least one pressure sensor is integrated in the signal generating unit or in the float, wherein a corrected signal is transmitted with the signal generating unit to the control device via a signal path of the signal generating unit.

3. The measurement device of claim 1, wherein the correction device comprises at least one displacement transducer for measuring a length change.

4. The measurement device of claim 3, wherein at least one displacement transducer is coupled with the signal generating unit and with a wall of the fuel tank.

5. A method for determining a fluid fill level in a fuel tank of a vehicle in presence of a deformation of the fuel tank, comprising the steps of:
   supplying with a signal generating unit a signal indicating the fluid fill level of the deformed fuel tank,
   measuring, with a pressure sensor installed above the fluid fill level in a vapor space of the fuel tank a vapor pressure in the fuel tank,
   correlating the measured vapor pressure with the deformation of the fuel tank based on at least one characteristic curve providing at least one correction value describing an extent of a deformation of the fuel tank in comparison to an undeformed fuel tank, and
   correcting the signal based on the deformation of the fuel tank computed with the at least one correction value and computing a corrected fluid fill level of the undeformed fuel tank that takes into account the deformation of the fuel tank.

* * * * *